United States Patent [19]

Oikawa

[11] Patent Number: 5,024,496

[45] Date of Patent: Jun. 18, 1991

[54] POLYGONAL MIRROR FOR SCANNING LIGHT BEAM

[75] Inventor: Tomohiro Oikawa, Yokohama, Japan

[73] Assignee: Ricoh Company, Ltd., Tokyo, Japan

[21] Appl. No.: 459,310

[22] Filed: Dec. 29, 1989

[30] Foreign Application Priority Data

Dec. 29, 1988 [JP] Japan .................................. 63-332471
Apr. 4, 1989 [JP] Japan .................................... 1-85514

[51] Int. Cl.$^5$ ............................................ G02B 26/10
[52] U.S. Cl. ..................... 350/6.8; 350/6.4; 350/609; 350/286
[58] Field of Search ............... 350/6.8, 6.7, 6.4, 286, 350/609, 616; 250/236, 235

[56] References Cited

U.S. PATENT DOCUMENTS 4,691,998 9/1987 Sakagaito et al. .................. 350/6.8
4,820,005 4/1989 Hashimoto et al. ................ 350/6.8

FOREIGN PATENT DOCUMENTS 56-74218 6/1981 Japan .................................... 350/6.4
58-136014 8/1983 Japan .................................... 350/6.8
2101766 1/1983 United Kingdom ................ 350/6.4

Primary Examiner—Bruce Y. Arnold
Assistant Examiner—Loha Ben
Attorney, Agent, or Firm—Oblon, Spivak, McClelland, Maier & Neustadt

[57] ABSTRACT

A polygonal mirror for use as a light beam deflector or scanner in an image exposure device includes a support on which a polygonal mirror body is mounted such that it is positionally limited thereby at positions near angular corners between mirror facets of the polygonal mirror. The polygonal mirror body may have a plurality of through holes defined therein on radial lines interconnecting said axis and said angular corners so that said polygonal prism body is subject to a substantially uniform moment of inertia about said axis upon rotation thereof. The holes may be filled with cores which are made of a material having a density smaller than the density of the material of which said polygonal prism body is made. Alternatively, a sheet of resin may be disposed on at least one of axially opposite surface of said polygonal prism body.

9 Claims, 8 Drawing Sheets

DIAMETER OF
INSCRIBED CIRCLE

POLYGONAL MIRROR FOR SCANNING LIGHT BEAM

BACKGROUND OF THE INVENTION

1. Field of the Invention

The present invention relates to a polygonal mirror for deflecting and scanning a light beam in an image exposure device, the polygonal mirror having a plurality of reflecting flat mirror facets disposed on the outer surface of a polygonal body which is rotatable about its central axis.

2. Prior Art

Image exposure devices used in digital image forming apparatus such as digital copying machines, facsimile machines, and laser printers, for example, convert an information signal to be recorded into a modulated light beam, which is deflected by a deflector to scan the surface of a photosensitive medium.

One example of such a deflector or scanner is a polygonal mirror which is rotatable about its own axis. The polygonal mirror has a plurality of reflecting flat mirror facets disposed on the outer circumferential surface of a polygonal body which is rotatable about the axis. When the polygonal body is rotated about the axis at a constant speed, the mirror facets are moved along a constant circumferential path to deflect the modulated light beam for thereby scanning the photosensitive medium.

Modern image forming apparatuses operate to produce images at higher densities and at higher speeds. Therefore, the polygonal mirrors used therein as deflectors or scanners are larger in size and higher in speed. One problem with the larger and higher polygonal mirrors is that they are apt to be distorted when rotating at high speeds.

Figure 11:
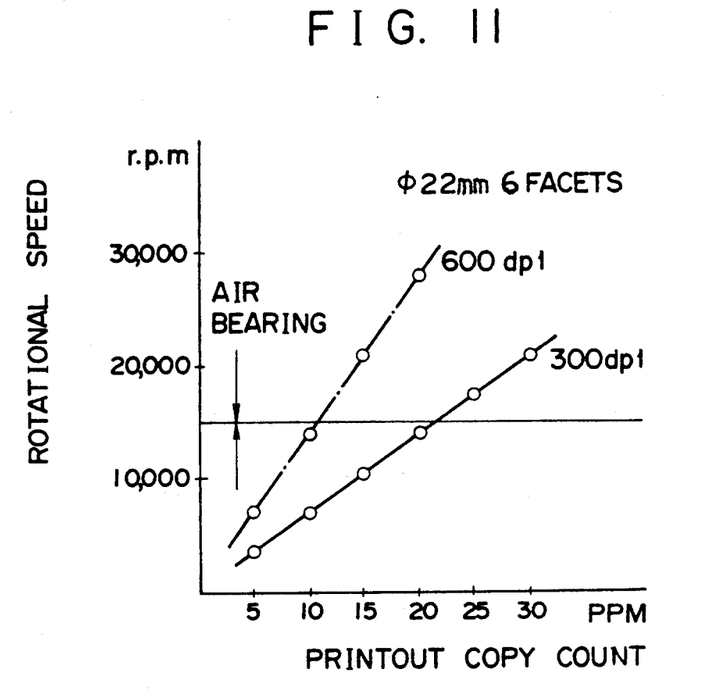
FIG. 11 is a graph showing the relationship between the printout copy count of an image forming apparatus and the rotational speed of a polygonal mirror used in the image forming apparatus.
Figure 12:
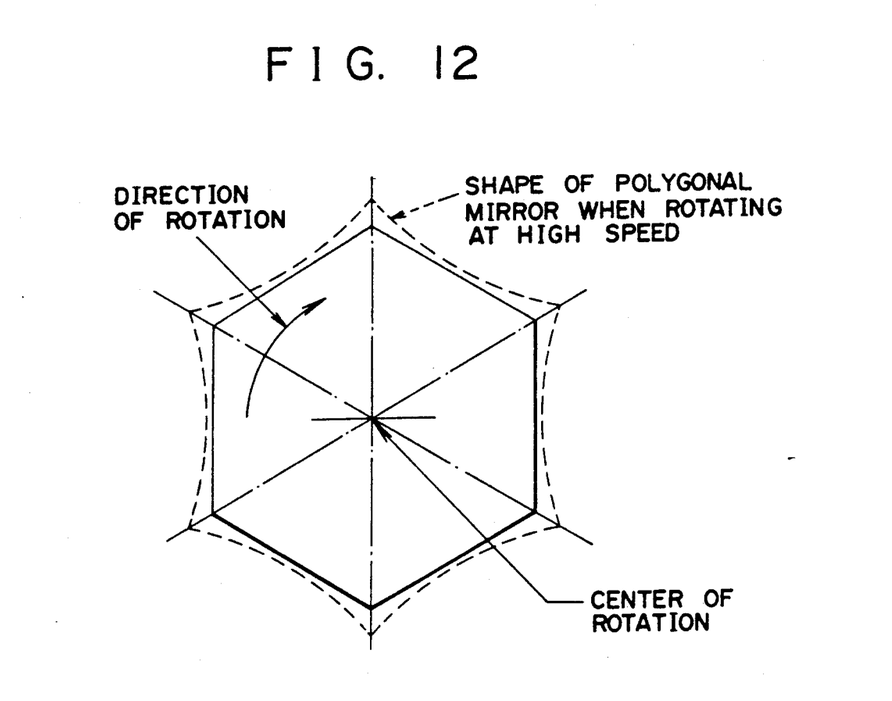
FIG. 12 is a plan view illustrative of the irregular distortion of a polygonal mirror upon rotation about its own axis.

FIG. 11 of the accompanying drawings shows the relationship between the printout copy count (indicated on the horizontal axis) of an image forming apparatus and the rotational speed (indicated on the vertical axis) of a polygonal mirror used in the image forming apparatus, the polygonal mirror having an inscribed circle whose diameter is 22 mm and six mirror facets. When a larger polygonal mirror is rotated at a higher speed, it is distorted into an irregular shape making the mirror facets uneven. This causes the problems that no optimum beam spot diameter can be maintained by the deflected light beam and no optimum beam intensity distribution can be achieved by the deflected light beam. More specifically, the polygonal body of the polygonal mirror has ununiform moments of inertia about the axis of rotation, and tend to be deformed irregularly about the axis upon rotation thereof. As shown in FIG. 12, the polygonal mirror which is being rotated is distorted such that the angular corners thereof are forcibly projected further radially outwardly as indicated by the broken line.

SUMMARY OF THE INVENTION

It is an object of the present invention to provide a polygonal mirror for scanning a light beam in an image exposure device, which polygonal mirror is uniformly deformable upon rotation so that the mirror facets are kept flat and can well deflect and scan the light beam.

Another object of the present invention is to provide a polygonal mirror of the above type, which suppresses noise that would otherwise be produced by surrounding air upon rotation.

According to the present invention, there is provided a polygonal mirror for scanning a light beam in an image exposure device, comprising a polygonal prism body rotatable about its own axis, a plurality of reflecting flat mirror facets disposed on an outer circumference of the polygonal prism body, the mirror facets being movable along a circumferential path to deflect a light beam applied thereto, the polygonal prism body having a plurality of angular corners each positioned between adjacent two of the mirror facets, and a support on which the polygonal prism body is mounted, the polygonal prism body being positionally limited by the support at positions near the angular corners.

Since the angular corners which would otherwise develop irregular moments of inertia, i.e., irregular distortion of the polygonal prism body, are positionally limited by the support, the polygonal prism body is prevented from being irregularly distorted. Upon rotation of the polygonal prism body, it is subjected to uniform distortion to the extent that the mirror facets remain flat. Therefore, the polygonal mirror can deflect or scan a light beam stably for an optimum beam spot and a beam intensity distribution.

According to the present invention, there is also provided a polygonal mirror for scanning a light beam in an image exposure device, comprising a polygonal prism body rotatable about its own axis, and a plurality of reflecting flat mirror facets disposed on an outer circumference of the polygonal prism body, the mirror facets being movable along a circumferential path to deflect a light beam applied thereto, the polygonal prism body having a plurality of angular corners each positioned between adjacent two of the mirror facets, the polygonal prism body also having a plurality of through holes defined therein on radial lines interconnecting the axis and the angular corners so that the polygonal prism body is subject to a substantially uniform moment of inertia about the axis upon rotation thereof.

The holes defined in the polygonal prism body allow the polygonal prism body to be uniformly distorted about the axis during rotation thereof. As a result, upon rotation of the polygonal mirror body, it is subjected to uniform distortion to the extent that the mirror facets remain flat. Therefore, the polygonal mirror can deflect or scan a light beam stably for an optimum beam spot and a beam intensity distribution.

In accordance with the present invention, there is further provided a polygonal mirror for scanning a light beam in an image exposure device, comprising a polygonal prism body rotatable about its own axis, a plurality of reflecting flat mirror facets disposed on an outer circumference of the polygonal prism body, the mirror facets being movable along a circumferential path to deflect a light beam applied thereto, the polygonal prism body having a plurality of angular corners each positioned between adjacent two of the mirror facets, the polygonal prism body also having a plurality of through holes defined therein on radial lines interconnecting the axis and the angular corners so that the polygonal prism body is subject to a substantially uniform moment of inertia about the axis upon rotation thereof, and a plurality of cores filled in the holes, respectively, the cores being made of a material having a density smaller than the density of the material of which the polygonal prism body is made.

The cores filled in the holes are effective to smooth air flows along the outer surfaces of the polygonal prism body, for thereby suppressing noise which would otherwise be generated by turbulent air flows. Accordingly, noise is reduced while the polygonal prism body is in rotation.

According to the present invention, there is also provided a polygonal mirror for scanning a light beam in an image exposure device, comprising a polygonal prism body rotatable about its own axis, a plurality of reflecting flat mirror facets disposed on an outer circumference of the polygonal prism body, the mirror facets being movable along a circumferential path to deflect a light beam applied thereto, the polygonal prism body having a plurality of angular corners each positioned between adjacent two of the mirror facets, the polygonal prism body also having a plurality of through holes defined therein on radial lines interconnecting the axis and the angular corners so that the polygonal prism body is subject to a substantially uniform moment of inertia about the axis upon rotation thereof, and a sheet of resin disposed on at least one of axially opposite surfaces of the polygonal prism body.

The sheet of resin mounted on at least one of the axially opposite surfaces of the polygonal prism body is also effective to smooth air flows along the outer surfaces of the polygonal prism body, for thereby suppressing noise which would otherwise be generated by turbulent air flows. Accordingly, noise is reduced while the polygonal prism body is in rotation.

The above and other objects, features and advantages of the present invention will become more apparent from the following description when taken in conjunction with the accompanying drawings in which preferred embodiments of the present invention are shown by way of illustrative example.

DETAILED DESCRIPTION

Prior to the description of preferred embodiments of the present invention, distortion of a polygonal mirror due to inertial forces during rotation thereof will first be described below.

When a polygonal mirror rotates at a high speed, safety should be insured for the polygonal mirror against destruction under centrifugal forces, i.e., centrifugal destruction. There are two theories, i.e., mean stress theory and maximum stress theory, which account for the centrifugal destruction. According to the mean stress theory, a circumferential stress is applied uniformly to a diametrical cross section of a rotating body, and when the applied stress becomes equal to the tensile strength $\sigma B$ of the matestress rial of the rotating body, the rotating body is destructed under centrifugal forces. According to the maximum stress theory, a rotating body starts cracking where a maximum stress is imposed, until it is destructed under centrifugal forces.

The mean stress theory is applicable to ductile materials such as aluminum (Al), copper (Cu), etc. If a polygonal mirror, which is made of a ductile material, is in the form of a disc having a central hole whose radius is $r_1$ and also having a radius $r_2$ from the center to the outer circumference, then when a mean stress $\sigma\text{mean}$ is equalized to the tensile stress $\sigma B$ of the material of the polygonal mirror, the following equation is satisfied:

$$\sigma\text{mean} = \frac{1}{3} \frac{\Omega \omega^2}{g} (r_1^2 + r_1 r_2 + r_2^2) = \sigma B (\text{kg/cm}^2) \quad (1)$$

where $\omega$ is the angular velocity which causes destruction (rad/sec), $\Omega$ is the density of the material (kg/cm$^3$), and $g$ is the gravitational acceleration (cm/sec$^2$). The angular velocity $\omega$ can be calculated from the above equation (1). The radii $r_1$, $r_2$ are in centimeters.

The maximum stress theory is applicable to brittle materials such as glass, quartz, etc. According to this theory, when a maximum circumferential stress $\sigma\text{max}$ has reached $\sigma B$, the angular velocity $\omega$ which causes destruction can be determined from the following equation:

$$\sigma\text{max} = \frac{3m+1}{4m} \frac{\Omega \omega^2}{g} \left( \frac{m-1}{3m+1} r_1^2 + r_2^2 \right) \quad (2)$$
$$= \sigma B (\text{kg/cm}^2)$$

where m is the Poisson ratio.

The rotational speeds at which various materials are destructed, as determined according to the above equations (1) and (2), are given as follows:

| Material | Rotational speed (rpm) |
|---|---|
| BK7 | 23,700 |
| Quartz | 31,200 |
| Al | 182,100 |
| Cu | 61,800 |
| Be | 175,700 |

The diameters are assumed to be $r_1 = r_2 = 3$ (cm) in the above calculations.

The approximate amount of distortion of a polygonal mirror made of Al whose diameters are $r_1 = 1.5$ (cm) and $r_2 = 3$ (cm), when the mirror rotates at the speed of 10,000 rpm, will now be determined. It is assumed that the polygonal mirror has a disc shape, but not a polygonal shape. The rotational speed of 10,000 rpm can be converted to the angular velocity $\omega$ of about 1,047 (rad/sec). When $\Omega = 2.69 \times 10^3$ (kg/cm$^3$), $\omega = 1,047$ (rad/sec), $g = 980$ (cm/sec$^2$), $r_1 = 1.5$ (cm), and $r_2 = 3$ (cm) are substituted into the equation (1), the following equation is obtained:

$$\sigma\text{mean} = \frac{1}{3} \frac{2.69 \times 10^3 \times 1047^2}{980} (1.5^2 + 1.5 \times 3 + 3^2)$$
$$= 15.8 \text{ (kg/cm}^2\text{)}$$

Therefore, the amount of distortion $\epsilon$ at this time is given as follows:

$$\epsilon = \frac{\sigma\text{mean}}{E} = \frac{15.8}{0.75 \times 10^6} = 2.1 \times 10^{-5}$$

where E is the Young's modulus. The amount of distortion $\Delta\gamma$ of the polygonal mirror at a position which is 3 cm spaced from the center of rotation is given by:

$$\Delta\gamma = 3 \times 2.1 \times 10^{-5}$$
$$= 6.3 \times 10^{-5} \text{ (cm)}$$
$$= 0.63 \text{ (}\mu\text{m)}$$

The amount of distortion is thus proportional to the rotational speed, and is in excess of 1 $\mu$m when the rotational speed is 20,000 (rpm).

Figure 13:
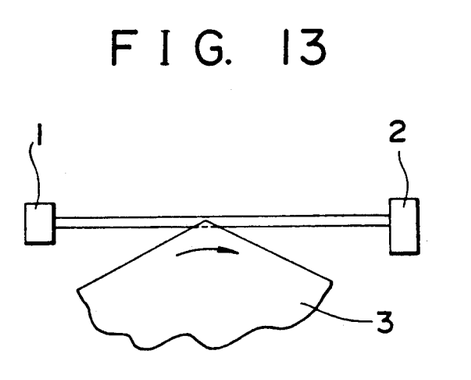
FIG. 13 is a fragmentary schematic view showing a measuring device comprising a laser beam source and a detector which are disposed in confronting relationship.

The above equations are based on the assumption that the polygonal mirror is of a disc shape. Therefore, more complex distortions or deformations are caused in actual polygonal mirrors. There are not available at present any accurate measurements of the behavior of a polygonal mirror while it is rotating at a high speed. However, there is known a measuring device, as shown in FIG. 13, which comprises a laser beam source 1 for emitting a laser beam and a detector 2 for detecting the emitted laser beam, the laser beam source 1 and the detector 2 being disposed in confronting relation to each other. The laser beam source 1 is oriented such that the laser beam emitted therefrom passes across an angular corner between adjacent mirror facets of a polygonal mirror 3. Any distortion of the polygonal mirror 3 can be determined when a change in the intensity of the laser beam detected by the detector 2. According to a measurement process based on the measuring device shown in FIG. 13, when a polygonal mirror, whose outside diameter is $r_2 = 3$ (cm) and which has six mirror facets, rotates at about 10,000 (rpm), it is considered that an angular corner between one mirror facet and an adjacent mirror facet is distorted radially outwardly by a few $\mu$m. A simulation based on the finite element method shows that a polygonal mirror which is rotating about its own axis is irregularly distorted around the axis as shown in FIG. 12. The various disadvantages, as described above with reference to the conventional polygonal mirrors, are caused by the irregular distortion.

Figure 14:
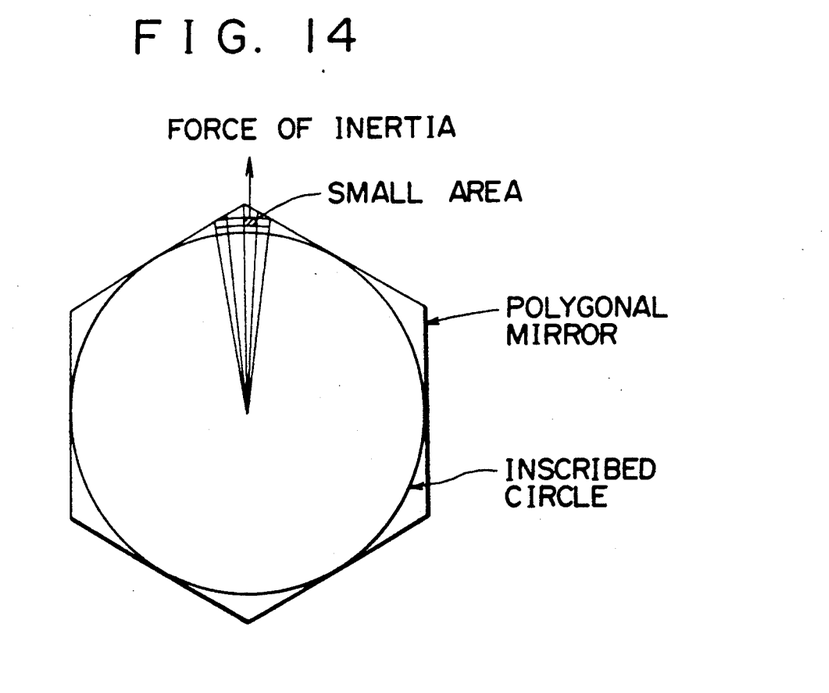
FIG. 14 is a plan view of a polygonal mirror, showing small regions into which it is divided hypothetically.

The irregular distortion of the polygonal mirror as shown in FIG. 12 results from the fact that the moments of inertia along the circumference of the polygonal mirror are not uniformized about the axis about which the polygonal mirror rotates. More specifically, if a polygonal mirror is hypothetically divided into small areas, as shown in FIG. 14, moments of inertia applied to small divided portions located radially outwardly of the inscribed circle of the polygonal mirror are not uniform in the circumferential direction of the inscribed circle, but an angular corner between two adjacent mirror facets is subjected to a radially outward tensile stress due to a large moment of inertia applied to the angular corner during rotation of the polygonal mirror at a high speed. Thus, the polygonal mirror is distorted as shown in FIG. 12 while rotating at a high speed.

Figure 1:
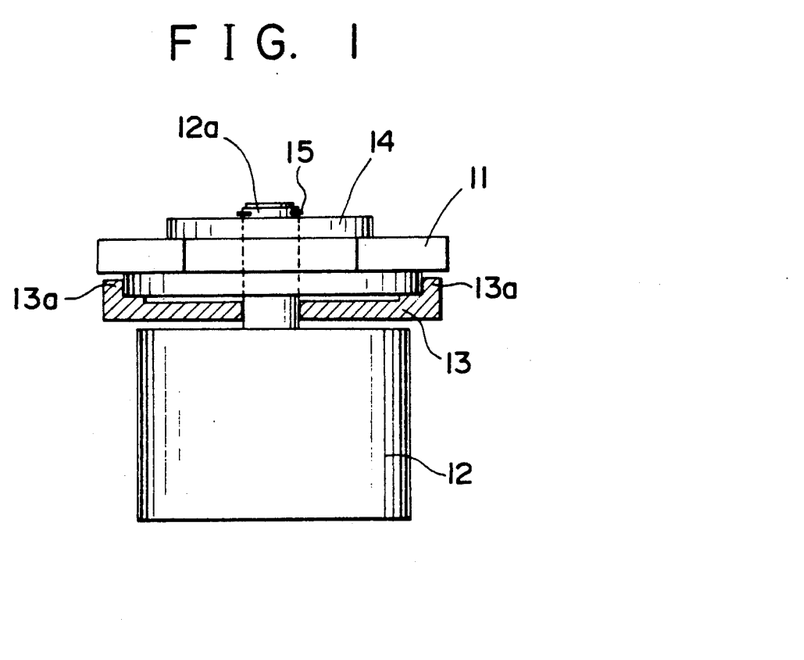
FIG. 1 is a side elevational view, partly in cross section, of a polygonal mirror according to an embodiment of the present invention.
Figure 2A:
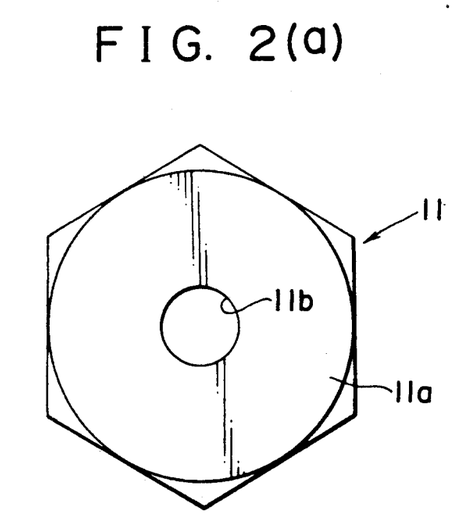
FIGS. 2(a) and 2(b) are plan and side elevational views, respectively, of a polygonal body of the polygonal mirror shown in FIG. 1.
Figure 2B:
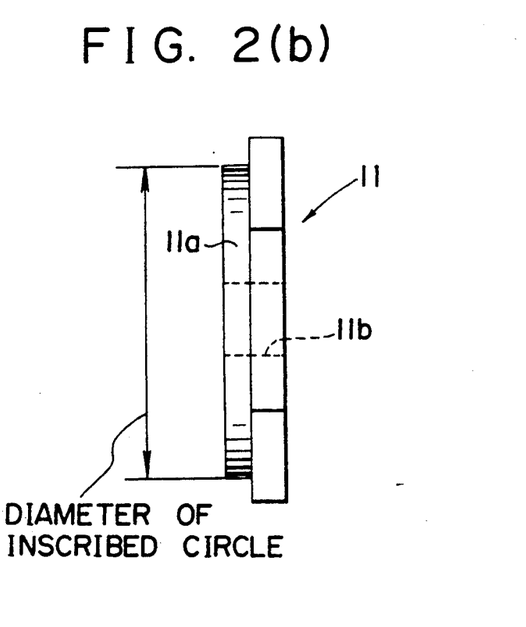

A polygonal mirror according to an embodiment of the present invention comprises, as shown in FIGS. 2(a) and 2(b), a body 11 in the form of a hexagonal prism, the body 11 including a cylindrical member 11a integrally formed with the bottom thereof. The cylindrical member 11a has a diameter such that it is inscribed in the outer hexagonal profile of the body 11. The body 11 has a central hole 11b defined therethrough. As shown in FIG. 1, the output shaft 12a of a drive motor 12 is inserted through the central hole 11b.

A disc-shaped support 13 is fixedly mounted on the output shaft 12a by any one of various known threaded coupling means. The support 13 has a concentric flange 13a on the outer circumferential edge thereof, the flange 13a having certain height along its axis The flange 13a has an annular recessed step on a radially inner wall thereof. The outer circumferential edge of the cylindrical member 11a is seated on the annular step of the flange 13a, and held in fixed engagement therewith so that the body 11 is positioned with respect to the support 13. A disc-shaped holder 14 is mounted on the upper surface (FIG. 1) of the body 11 and fitted over the output shaft 12a of the drive motor 12. A C-ring 15 for retaining the holder 14 in position is mounted on the upper surface of the holder 14 with a spring seat interposed therebetween. The body 11 is therefore clamped between the holder 14 and the support 13 under the pressure from the holder 13.

The outer circumference of the cylindrical member 11a of the hexagonal body 11 is positionally limited by the outer circumferential flange 13a of the support 13. Therefore, the angular corners of the hexagonal body 11 which would be responsible for the generation of irregular moments of inertia and hence for irregular distortion are positionally limited, thereby preventing themselves from being distorted under irregular moments of inertia. As a result, when the hexagonal body 11 is driven by the motor 12 to rotate at a high speed, the hexagonal) body 11 is uniformly distorted to the extent that the mirror facets on the outer circumference of the body 11 are kept flat.

The holder 14 may be threaded over the output shaft 12a of the drive motor 12, so that the hexagonal body 11 can be retained by the support 13 when the holder 14 is tightened.

Figure 3:
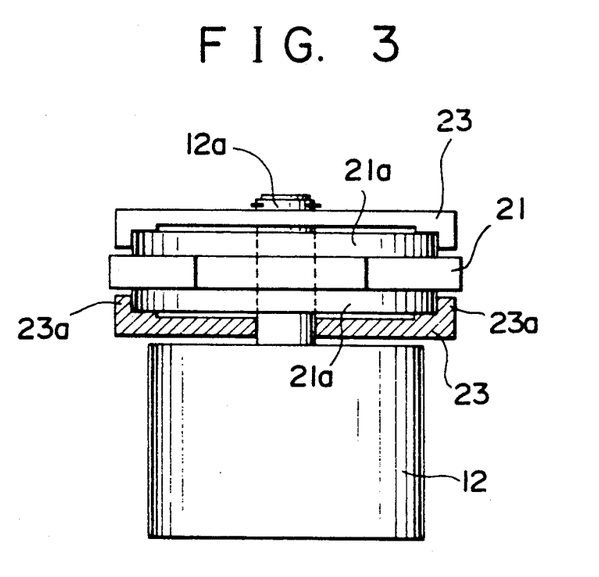
FIG. 3 is a side elevational view, partly in cross section, of a polygonal mirror according to another embodiment of the present invention.

FIG. 3 shows a polygonal mirror according to another embodiment of the present invention. The polygonal mirror shown in FIG. 3 includes a body 21 in the shape of a hexagonal prism, the body 21 having two cylindrical members 21a on axially opposite surfaces thereof, i.e., the top and respectively, thereof. The cylindrical members 21a have a diameter such that they are inscribed in the outer hexagonal profile of the body 21. The cylindrical members 21a are supported in engagement with flanges 23a, respectively, on the outer circumferences of supports 23 mounted on the output shaft 12a of the drive motor 12. With the embodiment shown in FIG. 3, the angular corners of the hexagonal body 21 are more reliably positionally limited against irregular distortion under irregular moments of inertia during high-speed rotation of the polygonal mirror.

Figure 4A:
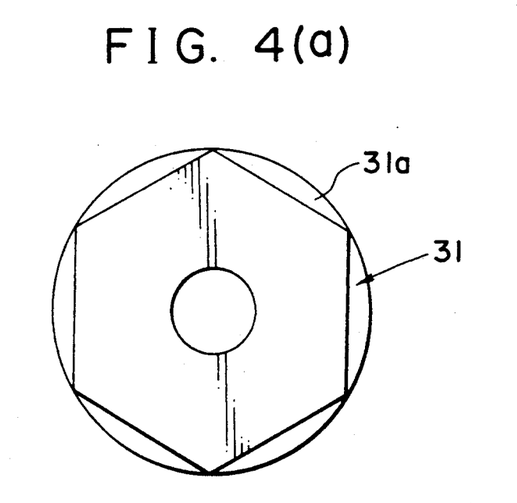
FIGS. 4(a) and 4(b) are plan and side elevational views, respectively, of a polygonal body of a polygonal mirror according to still another embodiment of the present invention.
Figure 4B:
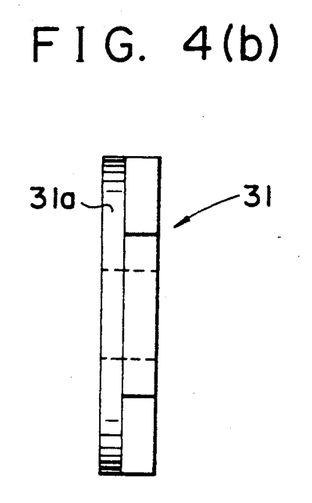

FIGS. 4(a) and 4(b) illustrate a polygonal mirror according to still another embodiment of the present invention. The polygonal mirror has a hexagonal prism body 31 including a cylindrical member 31a integrally formed with the bottom thereof. The cylindrical member 31a has a diameter such that it circumscribes the outer hexagonal profile of the body 31.

Figure 5A:
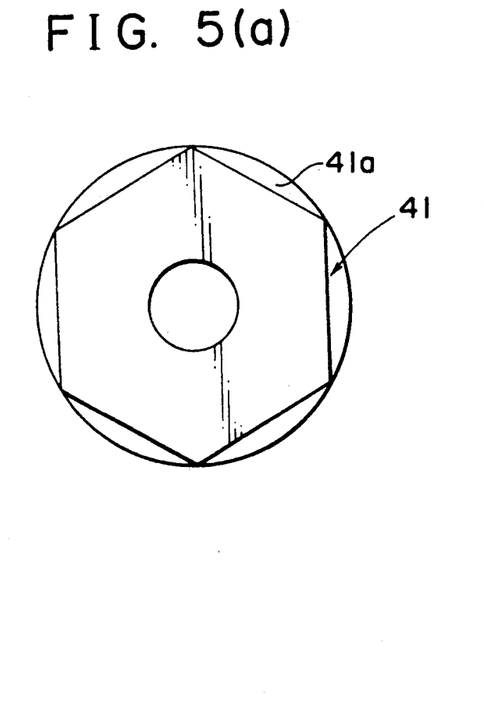
FIGS. 5(a) and 5(b) are plan and side elevational views, respectively, of a polygonal body of a polygonal mirror according to yet another embodiment of the present invention.
Figure 5B:
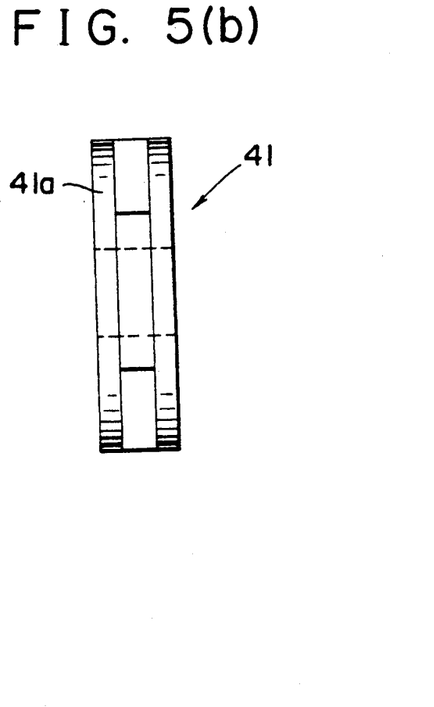

FIGS. 5(a) and 5(b) show a polygonal mirror according to yet anther embodiment of the present invention. The polygonal mirror has a hexagonal prism body 41 including two cylindrical members 41a integrally formed with the top and bottom thereof. The cylindrical members 41a have a diameter such that they circumscribe the outer hexagonal profile of the body 41.

The greater diameters of the cylindrical members 31a, 41a shown in FIGS. 4(a), 4(b) and 5(a), 5(b) allow the angular corners of the hexagonal bodies 31, 41 to be positionally limited at positions which are located more radially outwardly, so that any irregular distortion of the polygonal mirror is prevented more effectively.

Figure 6A:
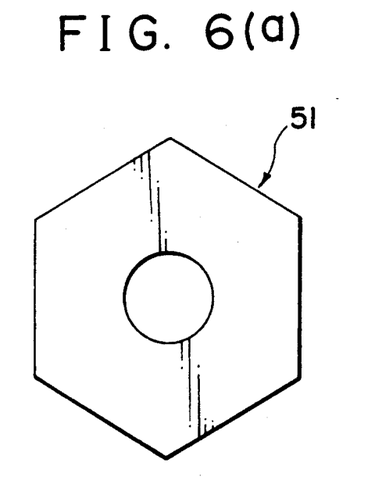
FIGS. 6(a) and 6(b) are plan and side elevational views, respectively, of a polygonal body of a polygonal mirror according to a further embodiment of the present invention.
Figure 6B:
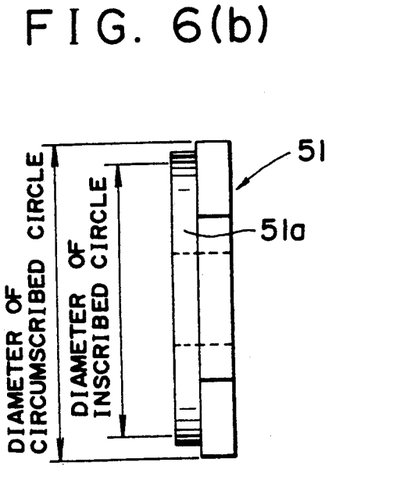

FIGS. 6(a) and 6(b) show a polygonal mirror according to a further embodiment of the present invention. In this embodiment, a cylindrical member 51a on the bottom of a hexagonal prism body 51 has a diameter which is intermediate between the diameters of inscribed and circumscribed circles of the hexagonal prism body 51.

Figure 15:
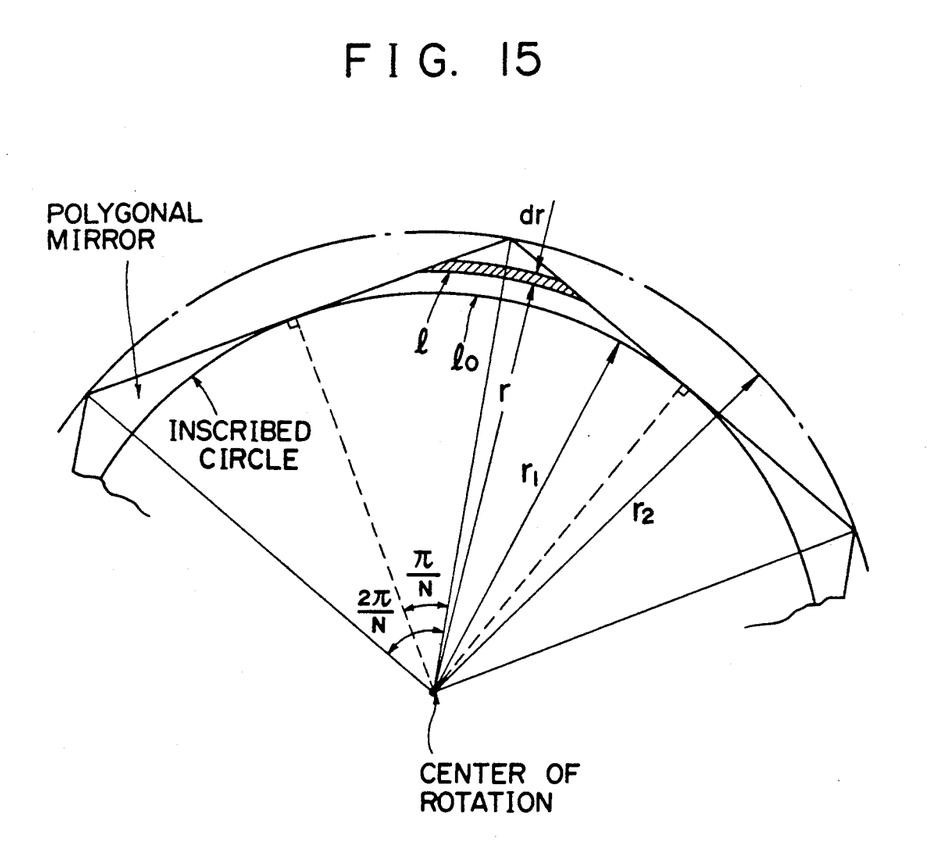
FIG. 15 is an enlarged fragmentary plan view showing angular corners of a polygonal mirror which are positioned radially outwardly of an inscribed circle.

A moment of inertia applied to a polygonal mirror represents the magnitude of an inertia produced upon angular motion, and is determined by the configuration and mass of the polygonal mirror. If the polygonal mirror has a constant density, the moment of inertia is represented by the product of quantity which is determined only by the shape of the rotating polygonal mirror and the entire mass of the rotating polygonal mirror. Now, the moment of inertia applied to an angular corner disposed radially outwardly of the inscribed circle of a polygonal mirror shown in FIG. 15 is determined as follows:

It is assumed that the inscribed circle of the polygonal mirror has a radius $r_1$, the circumscribed circle thereof has a radius $r_2$, an arc of the inscribed circle between points where the inscribed circle contacts two adjacent mirror facets has a length $l_0$, a small arcuate region (shown hatched) in the angular corner has an arc whose length, radius are indicated respectively by $l$, $r$, and the small arcuate region has a radial width $dr$, as shown in FIG. 15. As shown in FIG. 15, $$(r_2-r):l=(r_2-r_1):l_0$$

Hence, $$l = \frac{r_2 - r}{r_2 - r_1} l_0 \tag{3}$$

Since the area $dm$ of the small arcuate region is indicated by $ldr$, the following equation is obtained when it is substituted into the above equation (3):

$$dm = \frac{r_2 - r}{r_2 - r_1} l_0 dr \tag{4}$$

Therefore, the moment of inertia I to be determined is given by:

$$I = \int_{r_1}^{r_2} r^2 dm \frac{\rho}{g} = \int_{r_1}^{r_2} r^2 \frac{r_2 - r}{r_2 - r_1} l_0 \frac{\rho}{g} dr$$

This equation is simplified into:

$$I = \frac{\rho}{g} \frac{l_0}{r_2 - r_1} \left( \frac{r_1^4}{4} + \frac{r_2^4}{12} - \frac{r_1^3 r_2}{3} \right) \tag{5}$$

The dimensions $l_0$, $r_2$, the number N of mirror facets of the polygonal mirror, and the radius $r_1$ of the inscribed circle are related as follows:

$$l_0 = \frac{2}{N} r_1 \pi \tag{6}$$

$$r_2 = \frac{r_1}{\cos \frac{\pi}{N}} \tag{7}$$

When these equations (6) and (7) are substituted into the equation (5) the moment of inertia I is expressed by:

$$I = \left( \frac{\rho}{g} \right) \frac{\frac{2}{N} \pi}{\frac{1}{\cos \left( \frac{\pi}{N} \right)} - 1} \left\{ r_1^4 \left( \frac{1}{4} + \frac{1}{12 \cos^4 \frac{\pi}{N}} - \frac{1}{3 \cos \frac{\pi}{N}} \right) \right\} \tag{8}$$

Figure 7:
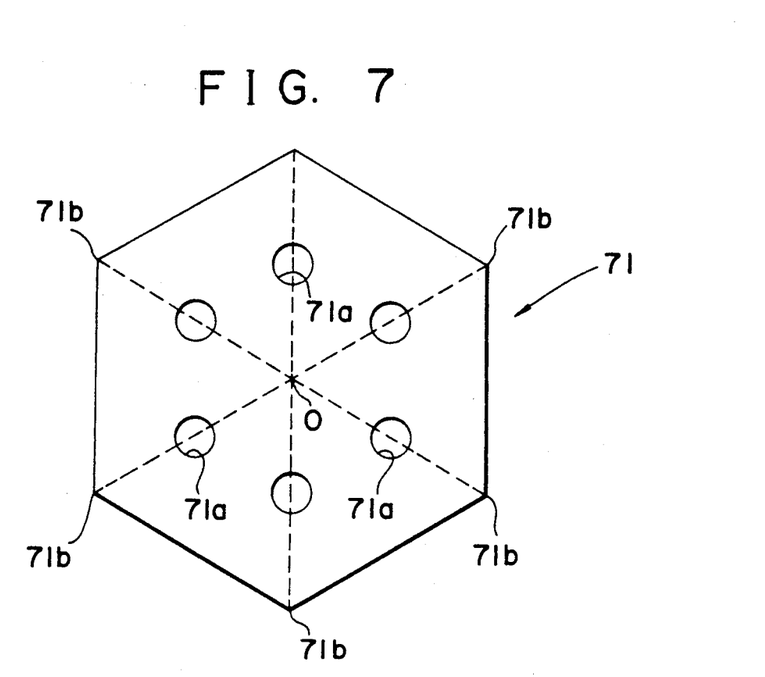
FIG. 7 is a plan view of a polygonal mirror according to a still further embodiment of the present invention.

FIG. 7 shows a hexagonal prism body 71 of a polygonal mirror according to a still further embodiment of the present invention. The hexagonal body 71 has six through holes 71a defined therethrough around the central axis O about which the polygonal mirror is rotatable. The holes 71a are positioned on radial lines, respectively, interconnecting the central axis O and angular corners 71b of the hexagonal body 71, so that the polygonal mirror will be subjected to a uniform moment of inertia during rotation thereof.

Figure 8:
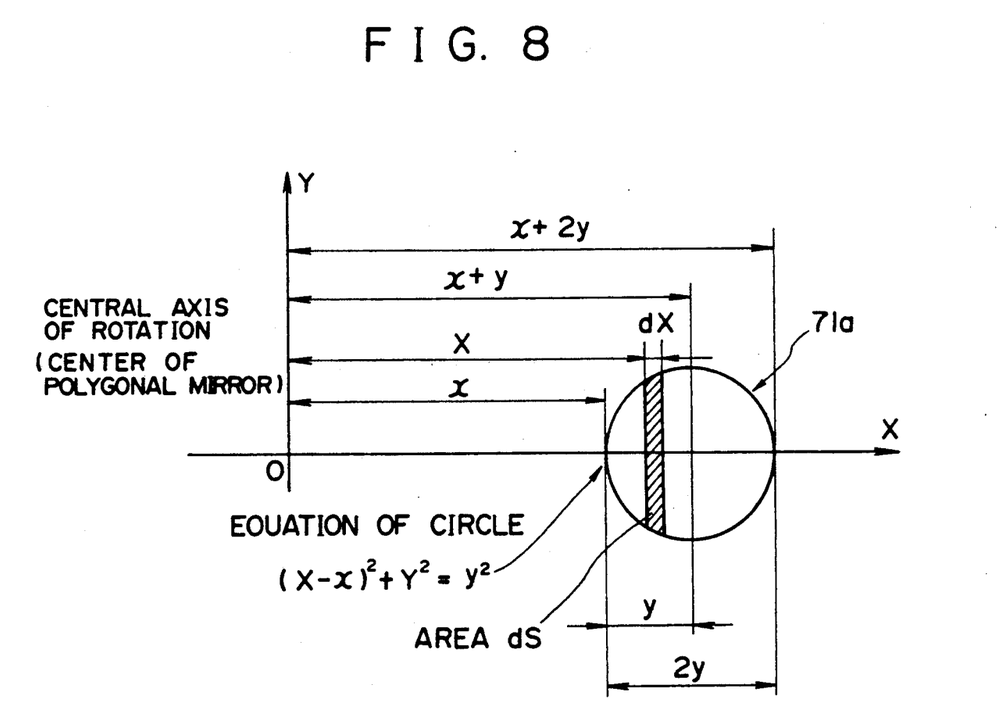
FIG. 8 is an enlarged plan view showing a portion of the polygonal mirror illustrated in FIG. 7.

The moment of inertia acting on the polygonal mirror shown in FIG. 7 will be analyzed below. It is assumed, as shown in FIG. 8, that a through hole 71a having a diameter of $2y$ is located at a position which is spaced a distance x from the central axis O along a radial line extending toward each angular corner 71b. A small hatched area ds is given by:

$$ds = AB \cdot dx \qquad \ldots (9)$$

The circle defined by the edge of the hole 71a is expressed by:

$$(X-x)^2 + Y^2 = y^2 \qquad \ldots (10)$$

Therefore, $$AB = 2\sqrt{y^2 - (X-x)^2} \qquad \ldots (11)$$

The moment of inertia I on the portion corresponding to the through hole about the central axis O is given by:

$$I = \int_{x-y}^{x+y} x^2 \cdot ds \cdot \frac{\rho}{g} \qquad (12)$$

When the equation (9) is substituted into the equation (12), we obtain:

$$I = \int_{x-y}^{x+y} x^2 \cdot AB \cdot dx \cdot \frac{\rho}{g}$$

$$I = \int_{x-y}^{x+y} x^2 \cdot 2\sqrt{y^2 - (X-x)^2} \cdot dx \cdot \frac{\rho}{g}$$

$$= \frac{\rho}{g} \left[ -\frac{1}{7}\{(x+y)^7 - (x-y)^7\} + \frac{x}{3}\{(x+y)^6 - (x-y)^6\} + \frac{y^2 - x^2}{5}\{(x+y)^5 - (x-y)^5\} \right]$$

From the equations (8) and (9), $$\frac{\frac{2}{N}\pi}{\cos\left(\frac{\pi}{N} - 1\right)} \left\{ r_1 4 \left( \frac{1}{4} + \frac{1}{12\cos^4 \frac{\pi}{N}} - \frac{1}{3\cos\frac{\pi}{N}} \right) \right\} =$$

$$\frac{\rho}{g} \left[ -\frac{1}{7}\{(x+y)^7 - (x-y)^7\} + \frac{x}{3}\{(x+y)^6 - (x-y)^6\} + \frac{y^2 - x^2}{5}\{(x+y)^5 - (x-y)^5\} \right]$$

By employing x and y which satisfy the above equation, there is obtained a polygonal mirror in which the moment of inertia I about the central axis O is uniformized.

In the embodiment shown in FIG. 7, since the through holes 71a are defined in the polygonal body 71 on the radial lines from the central axis O to the angular corners 71b which would be responsible for irregular distortion due to irregular moments of inertia, the body 71 is distorted substantially uniformly around the central axis O when it rotates. As a result, the mirror facets on the outer circumference of the body 71 remain flat during rotation of the body 71.

Figure 9:
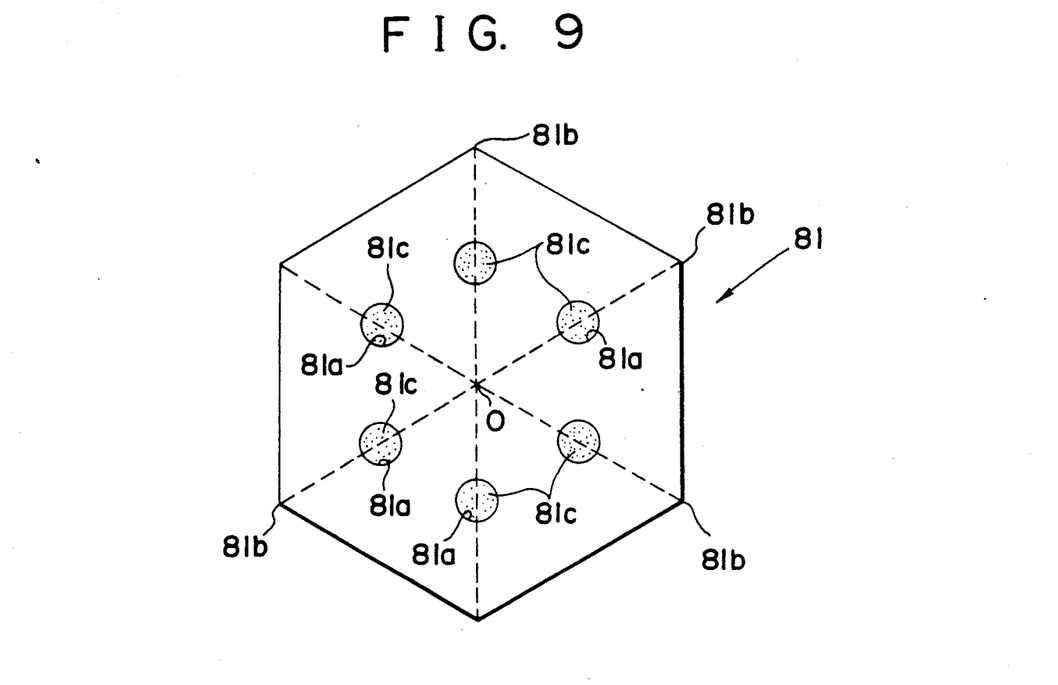
FIGS. 9 and 10 are plan and side elevational views, respectively, of a polygonal mirror according to a yet further embodiment of the present invention.

FIG. 9 shows a hexagonal prism body 81 of a polygonal mirror according to a yet further embodiment of the present invention. The hexagonal body 81 has six through holes 81a defined therethrough around the central axis O about which the polygonal mirror is rotatable, so that the moment of inertia on the body 81 will be substantially uniformized during rotation. The holes 81a are positioned on radial lines, respectively, interconnecting the central axis O and angular corners 81b of the hexagonal body 81. Each of the holes 81a is filled with a core 81c which is made of a material having a smaller density than that of the material of which the polygonal body 81 is made. The material of the core 81c may be any of various resin or rubber materials which can easily be shaped, but may be any of other materials such as sponge.

According to the embodiment of FIG. 9, the through holes 81a are defined in the polygonal body 81 on the radial lines from the central axis O to the angular corners 81b which would be responsible for irregular distortion due to irregular moments of inertia. Thus, the body 81 is distorted substantially uniformly around the central axis O when it rotates. As a result, the mirror facets on the outer circumference of the body 81 remain flat during rotation of the body 81. In addition, the core 81c filled in each of the holes 81a serves to smooth air flows along the outer surfaces of the body 81 during rotation thereof, so that noise which would otherwise be produced by turbulent air flows is suppressed. It has been proposed to place a polygonal mirror in a box in order to reduce such air-induced noise, but it has been confirmed that the cover is not effective enough to reduce the noise.

According to a yet still further embodiment shown in FIG. 9, a hexagonal prism body 91 has six through holes 91a defined therethrough around the central axis O about which the polygonal mirror is rotatable, so that the moment of inertia on the body 91 will be substantially uniformized during rotation. The holes 91a are positioned on radial lines, respectively, interconnecting the central axis O and angular corners 91b of the hexagonal body 91. Sheets 91c of resin are attached to the top and bottom, or axially opposite surfaces, of the body 91, thus providing smooth top and bottom surfaces on the body 91.

Figure 10:
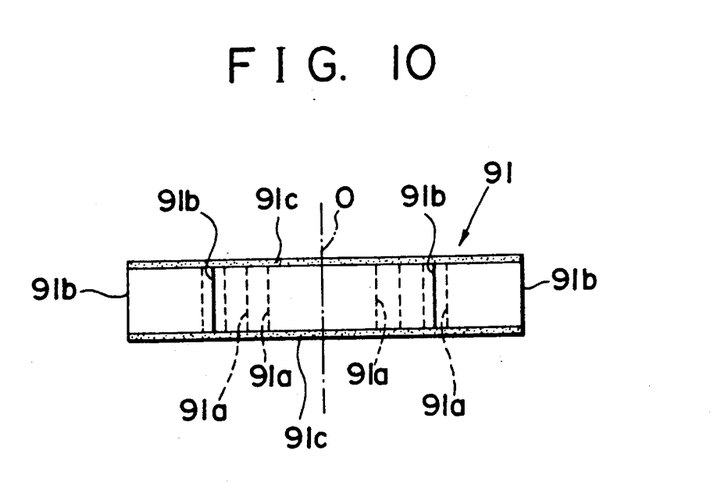

In the embodiment of FIG. 10, the through holes 91a are defined in the polygonal body 91 on the radial lines from the central axis O to the angular corners 81b which would be responsible for irregular distortion due to irregular moments of inertia. Therefore, the body 91 is distorted substantially uniformly around the central axis O when it rotates. As a result, the mirror facets on the outer circumference of the body 91 remain flat during rotation of the body 91. Furthermore, the smooth top and bottom surfaces provided by the sheets 91c serve to smooth air flows along the outer surfaces of the body 91 during rotation thereof, so that noise which would otherwise be produced by turbulent air flows is suppressed. Only one sheet 91c of resin may be attached to one of the top and bottom surfaces of the hexagonal body 91.

Although certain preferred embodiments have been shown and described, it should be understood that many changes and modifications may be made therein without departing from the scope of the appended claims.

What is claimed is:

1. A polygonal mirror for scanning a light beam in an image exposure device, comprising:
   a polygonal prism body rotatable about its own axis;
   a plurality of reflecting flat mirror facets disposed on an outer circumference of said polygonal prism body, said mirror facets being movable along a circumferential path to deflect a light beam applied thereto;
   said polygonal prism body having a plurality of angular corners each positioned between adjacent two of the mirror facets;
   a first cylindrical member integrally formed with said polygonal prism body; and
   a support on which said polygonal prism body is mounted, said support including an annular flange positionally limiting said polygonal prism body in a radial direction at positions near said angular corners.

2. A polygonal mirror for scanning a light beam in an image exposure device, comprising:
   a polygonal prism body rotatable about its own axis;
   a plurality of reflecting flat mirror facets disposed on an outer circumference of said polygonal prism body, said mirror facets being movable along a circumferential path to deflect a light beam applied thereto; and
   said polygonal prism body having a plurality of angular corners each positioned between adjacent two of the mirror facets, said polygonal prism body also having a plurality of through holes defined therein on radial lines interconnecting said axis and said angular corners so that said polygonal prism body is subject to a substantially uniform moment of inertia about said axis upon rotation thereof.

3. A polygonal mirror for scanning a light beam in an image exposure device, comprising:
   a polygonal prism body rotatable about its own axis;
   a plurality of reflecting flat mirror facets disposed on an outer circumference of said polygonal prism body, said mirror facets being movable along a circumferential path to deflect a light beam applied thereto;
   said polygonal prism body having a plurality of angular corners each positioned between adjacent two of the mirror facets, said polygonal prism body also having a plurality of through holes defined therein on radial lines interconnecting said axis and said angular corners so that said polygonal prism body is subject to a substantially uniform moment of inertia about said axis upon rotation thereof; and
   a plurality of cores filled in said holes, respectively said cores being made of a material having a density smaller than the density of the material of which said polygonal prism body is made.

4. A polygonal mirror for scanning a light beam in an image exposure device, comprising:
   a polygonal prism body rotatable about its own axis;
   a plurality of reflecting flat mirror facets disposed on an outer circumference of said polygonal prism body, said mirror facets being movable along a circumferential path to deflect a light beam applied thereto;
   said polygonal prism body having a plurality of angular corners each positioned between adjacent two of the mirror facets, said polygonal prism body also having a plurality of through holes defined therein on radial lines interconnecting said axis and aid angular corners so that said polygonal prism body is subject to a substantially uniform moment of inertia about said axis upon rotation thereof; and
   a sheet of resin disposed on at last one of axially opposite surfaces of said polygonal prism body.

5. The polygonal mirror according to claim 1, wherein said first cylindrical member has a diameter such that it is inscribed within an outer polygonal profile of the prism body.

6. The polygonal mirror according to claim 5, wherein said first cylindrical member is formed on a first side of said polygonal prism body, and a second cylindrical member having a diameter equal to the diameter of said first cylindrical member is formed on a second side of said polygonal prism body.

7. The polygonal mirror according to claim 1, wherein said first cylindrical member has a diameter such that it circumscribes an outer polygonal profile of the prism body.

8. The polygonal mirror according to claim 7, wherein said first cylindrical member is formed on a first side of said polygonal prism body, and a second cylindrical member having a diameter equal to the diameter of said first cylindrical member is formed on a second side of said polygonal prism body.

9. The polygonal mirror according to claim 1, wherein said first cylindrical member has a diameter which is intermediate between inscribed and circumscribed diameters of the polygonal prism body.

* * * * *